United States Patent [19]
Oranje

[11] Patent Number: 5,129,931
[45] Date of Patent: Jul. 14, 1992

[54] DEVICE FOR SEPARATING LIQUIDS AND/OR SOLIDS FROM A GAS STREAM

[75] Inventor: Leendert Oranje, Haren, Netherlands

[73] Assignee: N.V. Nederlandse Gasunie, Groningen, Netherlands

[21] Appl. No.: 593,218

[22] Filed: Oct. 4, 1990

[30] Foreign Application Priority Data

Dec. 2, 1989 [NL] Netherlands .................. 8902978

[51] Int. Cl.⁵ .................................................. B01D 45/16
[52] U.S. Cl. ..................................... 55/399; 55/457
[58] Field of Search ............ 55/449, 399, 457, 394, 55/392, 426

[56] References Cited

U.S. PATENT DOCUMENTS

| | | |
|---|---|---|
| 449,535 | 3/1891 | Hunter .......................... 55/449 X |
| 933,566 | 9/1909 | Kennedy ........................ 55/449 |
| 2,923,377 | 2/1960 | Schluderberg ............... 55/392 X |
| 3,590,558 | 7/1971 | Fernandes .................... 55/449 X |
| 3,822,533 | 7/1974 | Oranje .......................... 55/394 |
| 3,988,132 | 10/1976 | Oranje .......................... 55/399 |

Primary Examiner—Richard L. Chiesa
Attorney, Agent, or Firm—Cushman, Darby & Cushman

[57] ABSTRACT

The present invention relates to a device for the improved separation of liquids and/or solids from a gas stream which includes a cylindrical vessel in which the gas stream is rotated by helicoidal blades for separating the liquid and/or solids from the gas stream. The separated gas is discharged through an upwardly projecting pipe. At least one plate is provided under the gas discharge pipe and at least one diametrical baffle is provided beneath the bottom plate to stop the rotation of the separated liquids and/or solids.

12 Claims, 2 Drawing Sheets

DEVICE FOR SEPARATING LIQUIDS AND/OR SOLIDS FROM A GAS STREAM

FIELD OF THE INVENTION

The present invention relates to an apparatus for improved separation of liquids and/or solids from a gas stream.

BACKGROUND OF THE INVENTION

Cylindrical separators are known devices for separating impurities from gases at high pressures, for example, pressures of over 8 bar. An example of such a separating device is shown in U.S. Pat. No. 3,822,533.

A drawback of these separators stems from the violent rotation of the separated materials at the bottom of the vessel during operation. This causes abrasion or erosion of the bottom of the vessel and the inner wall near the bottom and makes it difficult to discharge the separated materials. Moreover, separated materials become entrained into the gas discharge pipe again, a phenomenon known as reentrainment. The separated liquids and/or solids are subsequently blown from the separator again, especially when the liquids or solids contained in the reservoir are still in motion.

To remedy these problems, U.S. Pat. No. 3,822,533 recommends fitting the separator with a large, circular plate arranged perpendicularly to the axis of the vessel, under the gas discharge pipe at a relatively short distance therefrom, and installing further means under the plate for settling the separated materials. For this reason, the circular plate is referred to as a settling plate.

The settling plate is effective, although not completely, in suppressing the rotation of the gas and the resultant separated impurities in the reservoir which causes the erosion of the vessel. To improve effectiveness, at least one diametrical baffle is installed under the settling plate to further suppress the rotation of the gas. Despite these modifications, fine moving particles still become entrained into the gas discharge pipe by the upward gas flow. To prevent this reentrainment, it is necessary to provide means for settling these particles.

An object of the present invention is to provide a separating device suitable for separating liquids and/or solids from a gas stream in which there is virtually no movement of fine particles at or near the bottom of the vessel, thus preventing solids from being entrained into the gas discharge pipe. To achieve that result, the total height of each baffle of the present invention is at least equal to the internal diameter of the vessel. Preferably, the separator employs two diametrical baffles, arranged perpendicularly to one another for keeping the gas at or near the bottom of the vessel at rest and causing the separated liquids and/or solids to settle. Consequently, there is virtually no more movement of fine particles, thus virtually suppressing reentrainment of the separated materials.

Preferably, each diametrical baffle has a slot that extends from the bottom edge of the baffle and is symmetrical with respect to the axis of the vessel. The slots in the baffles facilitate the cleaning of the pasty substance formed by the separated liquid and solids from the reservoir which would otherwise be difficult to remove. The slots in the baffles also prevent caking of the pasty substance which occurs particularly at the intersections of the baffles. Moreover, the use of baffles with slots facilitates the upward flow of the purified gas to the gas discharge pipe.

The slot in each baffle is preferably rectangular and the height of the slot is at least 0.6 times the internal diameter of the vessel. The part of the diametrical baffle that extends from one wall of the vessel to the other has a height at least 0.4 times the internal diameter of the vessel. The size of the slot measured in the direction perpendicular to the axis of the vessel is approximately 0.25 to 0.5 times the internal diameter of the vessel. The distance from the bottom edge of the settling plate to the top edge of the vertical baffles is at least 0.5 times the internal diameter of the vessel. Preferably, the top edge of each diametrical baffle is partially detached from the inner wall of the vessel to suppress turbulence.

The bottom of the vessel is preferably conically shaped in the direction of the discharge pipe for the separated liquids and/or solids. This results in a more steady discharge of the separated liquids and/or solids which settle due to the diametrical baffles.

Other objects, features, and characteristics of the present invention, as well as the methods, operation, and functions of the related elements of the structure and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PREFERRED EMBODIMENT

Figure 1:
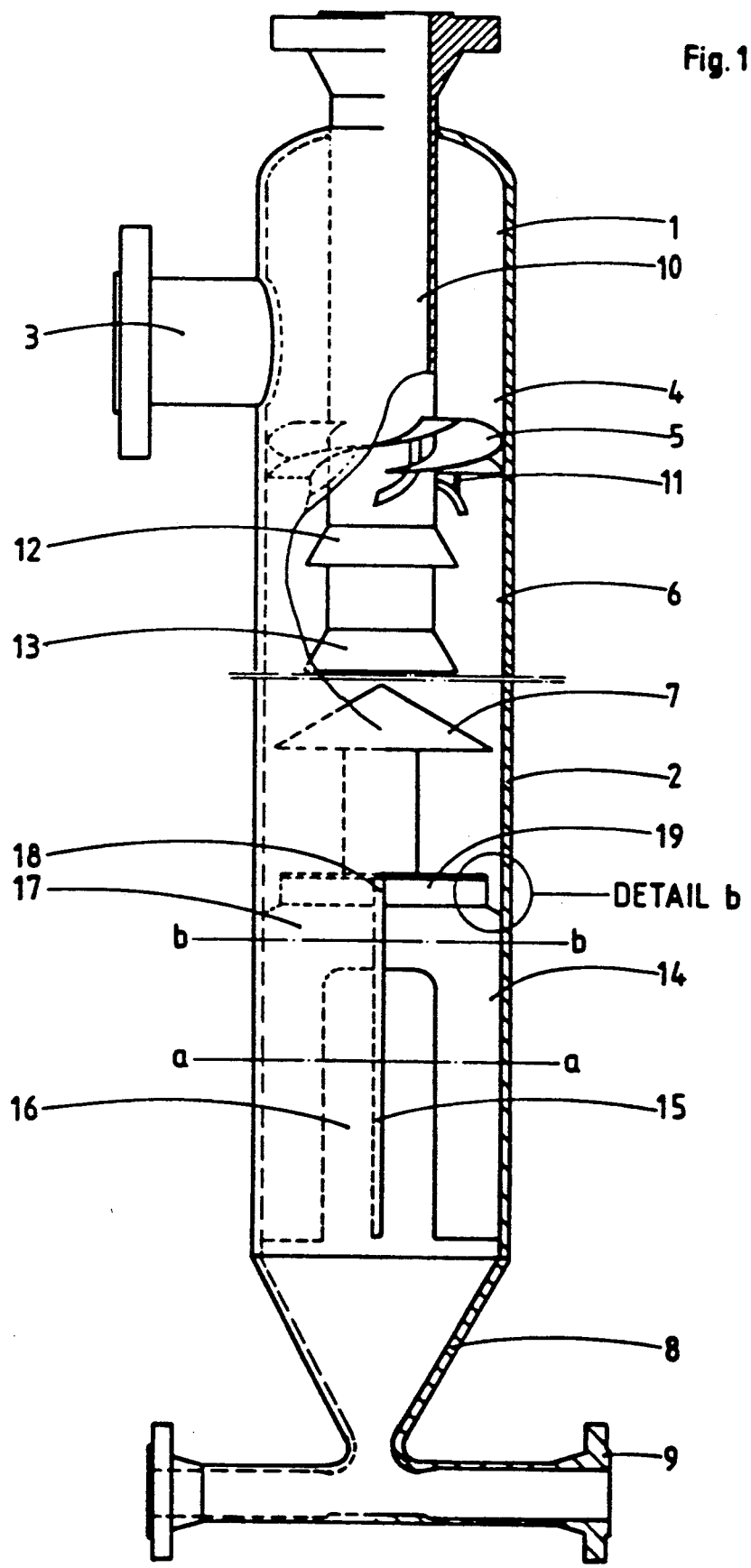
FIG. 1 is a partial vertical section of the separator according to the present invention.

FIG. 1 shows a gas separator vessel 2 according to the present invention shown in partial section. The gas to be purified is fed into the top compartment 1 of the separator 2 via inlet 3. A set of helicoidal impeller blades 5 arranged in the middle compartment 4 of separator 2 imparts a rotary motion to the gas which converts the flow energy of the gas into a centrifugal force necessary to produce separation. The separated liquid and/or solids collect against the inner wall 6 of the separator vessel 2 and then move downward and settle via the plates 7. The separated material is then discharged through the conical bottom 8 and the pipe 9.

The purified gas is discharged through the gas discharge pipe 10, which is mounted coaxially with the separator vessel 2 and projects upwards from the bottom compartment 6, through the middle compartment 4 and the top compartment. The helicoidal blades 5 are attached to the gas discharge pipe 10 at a desired distance from one another and partially overlap one another to create a curved channel. Each helicoidal blade 5 has a bottom section with a constant pitch and a section with a pitch that gradually increases in the upward direction. This arrangement gradually accelerates the gas fed into the separator 2, which results in a smaller pressure drop when the gas is rotated. Vertical baffles 11 are provided between the blades 5 to improve the liquid separating capacity. When viewed in the flow direction of the gas, the baffles 11 extend from the gas discharge tube 10 toward the inner wall 6 of the separator vessel 2. The baffles 11 are shaped like flat planes. Sharpening of the free ends of the baffles further improves liquid separating capacity.

To further improve the separation of liquids from the gas, conical sleeve sections 12 and 13 are fixed to the outer wall of the gas discharge pipe 10 in the separation section 6 of the separator vessel 2. Sleeve sections 12 and 13 serve as so-called anti-film skirts, that is, liquid adhering to the outer wall of the gas discharge pipe 10 is guided along these conical sleeve sections in the direction of the wall of the separator vessel 2.

The settling plate 7, which is preferably conically shaped, causes the liquids and/or solids separated from the gas to settle. Without plate 7, the separated liquids and/or solids would be in violent rotation at the bottom of the vessel which would cause erosion of the bottom 8 and the inner wall near the bottom 8 of the separator 2. The plate 7 is effective, although not completely, in suppressing the rotation of the gas in the reservoir which caused erosion of the separator vessel 2.

To improve effectiveness, diametrical baffles 14 and 15 are installed perpendicularly to one another under plate 7 so that the gas and, consequently, the separated liquids and/or solids, at and near the bottom 8 of the vessel 2 are kept at rest. The overall height of each of the baffles 14 and 15 is at least equal to the internal diameter of the separator vessel 2.

Figure 2:
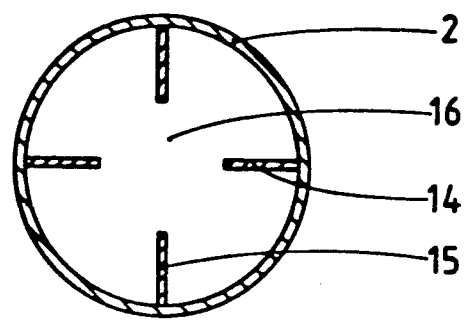
FIG. 2 is a cross-section of the separator according to the present invention along line a—a of FIG. 1.
Figure 3:
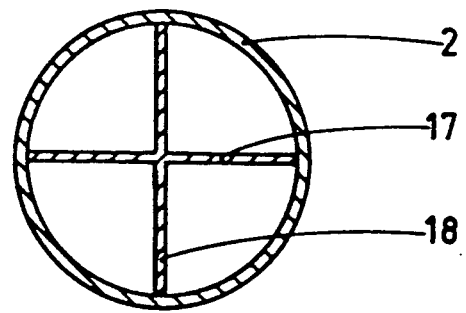
FIG. 3 is a cross-section of the separator according to the present invention along line b—b of FIG. 1.

As shown in FIGS. 1 and 2, each baffle 14 and 15 has a slot 16, which extends from the bottom edge of the baffle and is symmetrical with respect to the axis of the vessel. Slots 16 in baffles 14 and 15 facilitate the discharge of the pasty substance formed by the separated liquids and solids and avoid the caking thereof that would otherwise occur with baffles without slots, particularly at the intersection of the baffles. Moreover, the use of baffles 14 and 15 with slots 16 facilitates the upward flow of the purified gas to the gas discharge pipe 10.

Preferably, the slot 16 in each of the baffles 14 and 15 is rectangular and the height of the slot 16 is at least 0.6 times the diameter of the separator vessel 2. The parts 17 and 18 of the diametrical baffles 14 and 15, which extend from one of the walls of the separator vessel 2 to the other wall, has a height at least 0.4 times the internal diameter of the separator vessel 2. The size of the slot 16 in the direction perpendicular to the axis of the separator vessel 2 is 0.25 to 0.5 times the internal diameter of the separator vessel 2. The distance from the bottom edge of the settling plate 7 to the top edge of the vertical baffles 14 and 15 is at least 0.5 times the internal diameter of the separator vessel 2.

Figure 4:
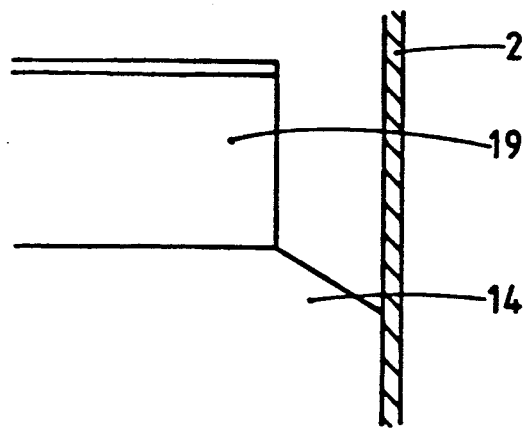
FIG. 4 is a cross-section of the vessel at detail b in FIG. 1.

As shown in FIGS. 1 and 4, the top edge 19 of each of the baffles 14 and 15 is partially detached from the inner wall of the separator vessel 2 to suppress turbulence. The bottom 8 of the separator vessel 2 is preferably conically shaped to produce a more steady discharge of the separated liquids and/or solids that have settled.

The device according to the present invention causes the fine particles to settle so that they are almost entirely prevented from becoming entrained into the gas discharge pipe.

Although the invention has been described in connection with what is presently considered to be the most practical and preferred embodiment, it is to be understood that the invention is not to be limited to the disclosed embodiment, but, on the contrary, is intended to cover various modifications and equivalent arrangements included within the spirit and scope of the appended claims, which scope is to be accorded the broadest interpretation to encompass all such modifications and equivalent structures.

What is claimed is:

1. A device for separating liquids and/or solids from a gas stream, comprising:
   a cylindrical vessel having an axis and an internal diameter;
   a first housing portion forming one end of said vessel, said first end housing portion having an inlet means for supplying said gas stream;
   a central housing portion connected to said first end housing portion;
   a plurality of blades arranged for rotation of said gas stream about said axis in said central housing portion;
   a second housing portion forming the other end of said vessel for separating said liquid and/or solids;
   a coaxial gas discharge pipe projecting through said central and said first end housing portions, said blades fixed around said coaxial discharge pipe, said second end housing portion having at least one settling plate arranged perpendicularly to said vessel axis;
   at least one diametrical baffle provided beneath said settling plate for suppressing rotation, and causing settlement, of said liquids and/or solids separated from said gas, each of said diametrical baffles having a slot that extends from a bottom edge of sad diametrical baffle parallel to said axis of said vessel along the entire extent of said slot.

2. The device as set forth in claim 1, wherein said second end housing portion has two perpendicular diametrical baffles.

3. The device as set forth in claim 1, wherein said slot is rectangular.

4. The device as set forth in claim 1, wherein the height of each diametrical baffle is at least equal to said internal diameter of said vessel.

5. The device as set forth in claim 1, wherein the height of said slot is at least 0.6 times said internal diameter of said vessel.

6. The device as set forth in claim 1, wherein a portion of each of said diametrical baffles extends the entire diameter of said vessel, said portion of said diametrical baffle having a height at least 0.4 times said internal diameter of said vessel.

7. The device as set forth in claim 1, wherein the size of said slot in a direction perpendicular to said axis of said vessel is approximately 0.25 to 0.5 times said internal diameter of said vessel.

8. The device as set forth in claim 1, wherein the distance from a bottom edge of said settling plate to a top edge of each of said diametrical baffles is at least 0.5 times said internal diameter of said vessel.

9. The device as set forth in claim 1, wherein a top edge of each diametrical baffle is partially detached from an inner wall of said vessel.

10. The device as set forth in claim 1, wherein second end housing portion of said vessel is conically shaped in the direction of a discharge pipe for the discharge of separated liquids and/or solids.

11. The device as set forth in claim 1, wherein said blades are helicoidally shaped.

12. A device for separating liquids and/or solids from a gas stream, comprising:
- a cylindrical vessel having an axis and an internal diameter;
- a first housing portion forming one end of said vessel, said first end housing portion having an inlet means for supplying said gas stream;
- a central housing portion connected to said first end housing portion;
- a plurality of blades arranged for rotation of said gas stream about said axis in said central housing portion;
- a second housing portion forming the other end of said vessel for separating said liquid and/or solid;
- a coaxial gas discharge pipe projecting through said central and said first end housing portion, said blades fixed around said coaxial discharge pipe, said second end housing portion having at least one settling plate arranged perpendicularly to said vessel axis;
- said second end housing portion having two perpendiculars diametrical baffles provided beneath said settling plate for suppressing rotation, and causing settlement, of said liquids and/or solids separated from said gas, each of said diametrical baffles having a slot that extends from a bottom edge of said diametrical baffle parallel to said axis of said vessel, and each of said diametrical baffles having a top edge that is partially detached from an inner wall of said vessel.

* * * * *